US008432712B2

(12) United States Patent
Borisov

(10) Patent No.: US 8,432,712 B2
(45) Date of Patent: Apr. 30, 2013

(54) SINGLE SWITCH HIGH EFFICIENCY POWER SUPPLY

(75) Inventor: Vladimir Borisov, Seneca, SC (US)

(73) Assignee: Itron, Inc., Liberty Lake, WA (US)

( * ) Notice: Subject to any disclaimer, the term of this patent is extended or adjusted under 35 U.S.C. 154(b) by 849 days.

(21) Appl. No.: 12/472,774

(22) Filed: May 27, 2009

(65) Prior Publication Data

US 2009/0296431 A1 Dec. 3, 2009

Related U.S. Application Data

(60) Provisional application No. 61/057,589, filed on May 30, 2008.

(51) Int. Cl.
  *H02M 3/06* (2006.01)
  *H02M 3/18* (2006.01)
  *H02J 3/12* (2006.01)
  *G05F 1/00* (2006.01)

(52) U.S. Cl.
  USPC .............................. 363/62; 323/242; 307/110

(58) Field of Classification Search .................. 307/110; 320/1; 323/242, 243; 363/62
  See application file for complete search history.

(56) References Cited

U.S. PATENT DOCUMENTS

| 3,505,586 | A | * | 4/1970 | Dulin | 363/62 |
| 4,623,824 | A | * | 11/1986 | Scolari et al. | 315/241 R |
| 4,649,468 | A | | 3/1987 | Cubbison, Jr. | |
| 4,680,688 | A | * | 7/1987 | Inou et al. | 363/21.1 |
| 5,446,644 | A | * | 8/1995 | Zhou | 363/62 |
| 6,198,645 | B1 | * | 3/2001 | Kotowski et al. | 363/59 |
| 6,980,449 | B2 | * | 12/2005 | Chang | 363/84 |
| 7,365,523 | B2 | * | 4/2008 | Malherbe et al. | 323/268 |
| 7,468,622 | B2 | * | 12/2008 | Bodano et al. | 327/390 |
| 7,554,219 | B2 | * | 6/2009 | Weger | 307/35 |

OTHER PUBLICATIONS

International Search Report for PCT International Application No. PCT/US2009/045380 dated Aug. 7, 2009.
"A Low Cost Tamper-Resistant Energy Meter Based on the ADE7761 with Missing Neutral Function" by Stephen T. English and Etienne Moulin, pp. 1-20 of Application Note AN-687 published by *Analog Devices*, copyright 2004.
"Switched Capacitor Voltage Regulator Provides Current Gain" by Jeff Witt, pp. 28-29 from *Linear Technology Magazine*, Feb. 1999.

\* cited by examiner

*Primary Examiner* — Adolf Berhane
*Assistant Examiner* — Gary Nash
(74) *Attorney, Agent, or Firm* — Dority & Manning, P.A.

(57) ABSTRACT

Disclosed are apparatus and methodology for providing a capacitive voltage divider configured to reduce a relatively high level alternating current (AC) to a lower level direct current (DC). The apparatus provides a series of capacitors and diodes configured for series charging of the capacitors and parallel discharge thereof by way of a single switching element. In operation, the capacitor series is charged during the negative half cycle of the AC source and then discharged during the positive half cycle thereof.

5 Claims, 3 Drawing Sheets

SINGLE SWITCH HIGH EFFICIENCY POWER SUPPLY

PRIORITY CLAIM

This application claims the benefit of previously filed U.S. Provisional Patent Application entitled "Single Switch Unregulated Inductorless High Voltage High Efficiency Power Supply," assigned U.S. Ser. No. 61/057,589, filed May 30, 2008, and which is incorporated herein by reference for all purposes.

FIELD OF THE INVENTION

The present subject matter relates to power supplies. More particularly, the present subject matter relates to a series charge, parallel discharge capacitor power supply requiring only a single switch and no inductor in order to shift from charge mode to discharge mode.

BACKGROUND OF THE INVENTION

Power supplies constructed using the known concept of serially charging a series of capacitors and discharging the series in parallel are known in the art. Such configurations may be used, for example, with variations in excitation, for a variety of configurations. In one example, U.S. Pat. No. 5,446,644 (Zhou) discloses a direct current (DC) voltage divider configuration employing a diode and capacitor configuration very similar to that illustrated herein in FIGS. 1 and 2. In such '644 patent configuration, a DC supply is applied as the input to a diode and capacitor series circuit by way of a first switch. A second switch is configured to couple a number of diodes to the series connected capacitors to provide a parallel discharge path. Generally, such arrangement operates as a voltage divider in order to convert a relatively higher DC voltage to a relatively lower DC voltage. With an input DC voltage to such circuit, Zhou operates the switches alternately at a frequency chosen to produce a desired output voltage level. Such form of operation results in a somewhat selectively variable output voltage but at the cost of complex variable frequency alternating operation of such two switches.

In a somewhat similar arrangement, Cubbison, Jr. (U.S. Pat. No. 4,649,468) discloses a voltage divider circuit employing a series charge/parallel discharge diode/capacitor circuit where the diodes provide the switching without additional switches. The circuit in such Cubbison, Jr. arrangement, however, provides sub-divided capacitors, with varying numbers of capacitors used directly connected in series to provide desired low voltage outputs.

An "Analog Devices" article illustrates the use of a capacitor divider power supply in an electric meter. See, Analog Devices Application Note AN-687, "A Low Cost Tamper-Resistant Energy Meter Based on the ADE7761 with Missing Neutral Function" by English and Moulin, 2004, including material starting on page 7 of such publication under the title "Power Supply Design." A Linear Technology Magazine article illustrates a switch capacitor voltage regulator that is configured to provide current gain. See, Design Ideas, "Switched Capacitor Voltage Regulator Provides Current Gain" Linear Technology Magazine, February 1999.

Despite some benefits offered by such configurations and others, it would, nevertheless, be beneficial to provide a simplified series-parallel capacitor-diode voltage dividing circuit that was able to produce a regulated low DC voltage based on a higher level alternating current (AC) input source.

While various implementations of series-parallel capacitor-diode voltage dividing circuits have been developed, and while various combinations of AC to DC and DC to DC voltage divider circuits have been developed, no design has emerged that generally encompasses all of the desired characteristics as hereafter presented in accordance with the subject technology.

SUMMARY OF THE INVENTION

In view of the recognized features encountered in the prior art and addressed by the present subject matter, an improved single switch series-parallel capacitor-diode voltage dividing circuit has been provided.

In an exemplary configuration, a voltage divider for converting high voltage alternating current (AC) into a relatively lower direct current (DC) regulated supply is provided. The voltage dividing power supply includes a plurality of capacitors connected in series with a plurality of diodes for charging the capacitors, and a second plurality of diodes coupled to each of the series connected capacitors and to a single switch for discharging the capacitors.

In one of their simpler forms, capacitive voltage dividers having input and output portions where the input portion is configured for unidirectional transmission of current from an input source to the capacitive divider and the input and output portions of the divider are configured to operate alternately.

One present exemplary embodiment relates to a power supply for reducing a relatively high level alternating current (AC) from an AC source to a relatively lower level direct current (DC), comprising a voltage divider and a means for controlling operation of a single switching element. Preferably, such exemplary voltage divider may be configured as a series of capacitors and diodes arranged for series charging of the capacitors and parallel discharge thereof by way of a single switching element and no inductor in order to shift from charge mode to discharge mode; and such means for controlling operation of such single switching element is provided such that the capacitor series is charged during the negative half cycle of the AC source and then discharged during the positive half cycle thereof, thereby producing a relatively low DC voltage based on the relatively higher level AC input source.

In various forms of the foregoing exemplary embodiment, such voltage divider may include a plurality of capacitors connected in series with a first plurality of diodes for charging the capacitors, and a second plurality of diodes coupled to each of the series connected capacitors and to a single switch element for discharging the capacitors, with such voltage divider configured for having respective input and output portions, with such input portion configured for unidirectional transmission of current from the input source to the capacitive divider, and with the input and output portions of the divider configured to operate alternately. Still, in further variations, such series capacitors and such first plurality of diodes may comprise an alternating series string beginning with a diode and ending with a capacitor; and such power supply may further include a first ground reference connection connected to the beginning of such alternating series string, and a second ground reference connected to the end of such alternating series by such single switch element during a discharge mode of such power supply.

In some embodiments of the foregoing, such power supply may further include a load associated with discharge of such voltage divider, and a filter capacitor in parallel with such load, to provide ripple filtering and to assist in voltage regulation of the low voltage DC produced by discharge of such voltage divider.

Still further, such an exemplary present power supply may optionally include circuitry for automatically switching such voltage divider between charge and discharge cycles thereof; and wherein such circuitry may include a voltage comparator and a reference, for comparing the voltage output of such power supply with such reference.

Such present exemplary power supply embodiments in some variations thereof may further include a series diode and a dissipater element in series with the AC input source and such alternating series string. Still further, in some embodiments, the AC input source corresponds to about a 400 VAC input voltage, and the voltage output of such power supply is about 5 VDC.

Another present exemplary embodiment may relate to a power supply for reducing a relatively high level alternating current (AC) from an AC source of up to about 500 VDC to a relatively lower level direct current (DC) of less than about 10 VDC, comprising a voltage divider including a plurality of capacitors connected in series with a first plurality of diodes for charging the capacitors from an AC input source with unidirectional transmission of current from the input source to the voltage divider, with such series capacitors and such first plurality of diodes comprising an alternating series string beginning with a diode and ending with a capacitor, and such voltage divider including a second plurality of diodes coupled to each of the series connected capacitors and to a single switch element for alternately discharging the capacitors into an associated output load; a first ground reference connection connected to the beginning of such alternating series string; a second ground reference connected to the end of such alternating series by such single switch element during a discharge mode of such power supply; and circuitry for automatically switching such single switching element so that the plurality of capacitors are charged during the negative half cycle of the AC source and then discharged during the positive half cycle thereof, thereby producing a relatively low DC voltage based on the relatively higher level AC input source.

Some variations of the foregoing may further include a series diode and a dissipater element in series with the AC input source and such alternating series string. Still further, others may include a filter capacitor in parallel with the output load, to provide ripple filtering and to assist in voltage regulation of the low voltage DC produced by discharge of such voltage divider; and wherein the AC input source corresponds to about a 400 VAC input voltage, and the voltage output of such power supply is about 5 VDC. Other present exemplary variations may include such exemplary circuitry including a voltage comparator and a reference, for comparing the voltage output of such power supply with such reference.

It should be also understood and appreciated that the present subject matter equally relates to corresponding methodologies and related apparatuses.

One present exemplary method encompasses power supply methodology for reducing a relatively high level alternating current (AC) from an AC source to a relatively lower level direct current (DC), comprising providing a voltage divider configured as a series of capacitors and diodes arranged for series charging of the capacitors and parallel discharge thereof by way of a single switching element and no inductor in order to shift from charge mode to discharge mode; and controlling operation of the single switching element so that the capacitor series is charged during the negative half cycle of the AC source and then discharged during the positive half cycle thereof, thereby producing a relatively low DC voltage based on the relatively higher level AC input source.

In present variations of such present methodology, providing such voltage divider may include providing a plurality of capacitors connected in series with a first plurality of diodes for charging the capacitors, and a second plurality of diodes coupled to each of the series connected capacitors and to a single switch element for discharging the capacitors, with such voltage divider configured for having respective input and output portions, with such input portion configured for unidirectional transmission of current from the input source to the capacitive divider, and with the input and output portions of the divider configured to operate alternately.

In other present variations such power supply methodology may include the series capacitors and first plurality of diodes comprising an alternating series string beginning with a diode and ending with a capacitor; and such power supply methodology further including providing a first ground reference connection connected to the beginning of the alternating series of first plurality of diodes and series capacitors; providing a second ground reference connected to the end of such alternating series by such single switch element during a discharge mode of such power supply; and providing a series diode and a dissipater element in series with an AC input source and the first plurality of diodes/series capacitor charging string.

In exemplary variations of the present power supply methodology, charging of the plurality of capacitors may be achieved during the negative half cycle of the AC input source by coupling an upper end of the first plurality of diodes to a ground potential and by forcing such ground potential to be relatively positive with respect to a lower end of the first plurality of diodes/capacitor string as the output of the AC input source goes through its negative half cycle; discharging of the plurality of capacitors may be achieved during the positive half cycle of the AC input source by closing the single switching element so as to discharge the plurality of capacitors through the second plurality of diodes, into a load associated therewith; and such power supply methodology may further include providing a filter capacitor in parallel with such load, to provide ripple filtering and to assist in voltage regulation of the low voltage DC produced by discharge of the capacitive voltage divider.

Other present exemplary variations of the subject power supply methodology may further include providing circuitry for automatically switching the capacitive voltage divider between charge and discharge cycles thereof. In certain instance, such exemplary circuitry may include a voltage comparator comparing the voltage output of such power supply with a reference; and such power supply methodology may further include using an optical isolation device, and peak tracking of the voltage output, to provide relatively high efficiency switching operations. In other present variations, the AC input source may correspond to about a 400 VAC input voltage, and the voltage output of such power supply may be about 5 VDC.

Additional objects and advantages of the present subject matter are set forth in, or will be apparent to, those of ordinary skill in the art from the detailed description herein. Also, it should be further appreciated that modifications and variations to the specifically illustrated, referred and discussed features, elements, and steps hereof may be practiced in various embodiments and uses of the present subject matter without departing from the spirit and scope of the subject matter. Variations may include, but are not limited to, substitution of equivalent means, features, or steps for those illustrated, referenced, or discussed, and the functional, operational, or positional reversal of various parts, features, steps, or the like.

Still further, it is to be understood that different embodiments, as well as different presently preferred embodiments, of the present subject matter may include various combinations or configurations of presently disclosed features, steps, or elements, or their equivalents (including combinations of features, parts, or steps or configurations thereof not expressly shown in the figures or stated in the detailed description of such figures). Additional embodiments of the present subject matter, not necessarily expressed in the summarized section, may include and incorporate various combinations of aspects of features, components, or steps referenced in the summarized objects above, and/or other features, components, or steps as otherwise discussed in this application. Those of ordinary skill in the art will better appreciate the features and aspects of such embodiments, and others, upon review of the remainder of the specification.

BRIEF DESCRIPTION OF THE DRAWINGS

A full and enabling disclosure of the present subject matter, including the best mode thereof, directed to one of ordinary skill in the art, is set forth in the specification, which makes reference to the appended figures, in which.

Figures 1, 2:
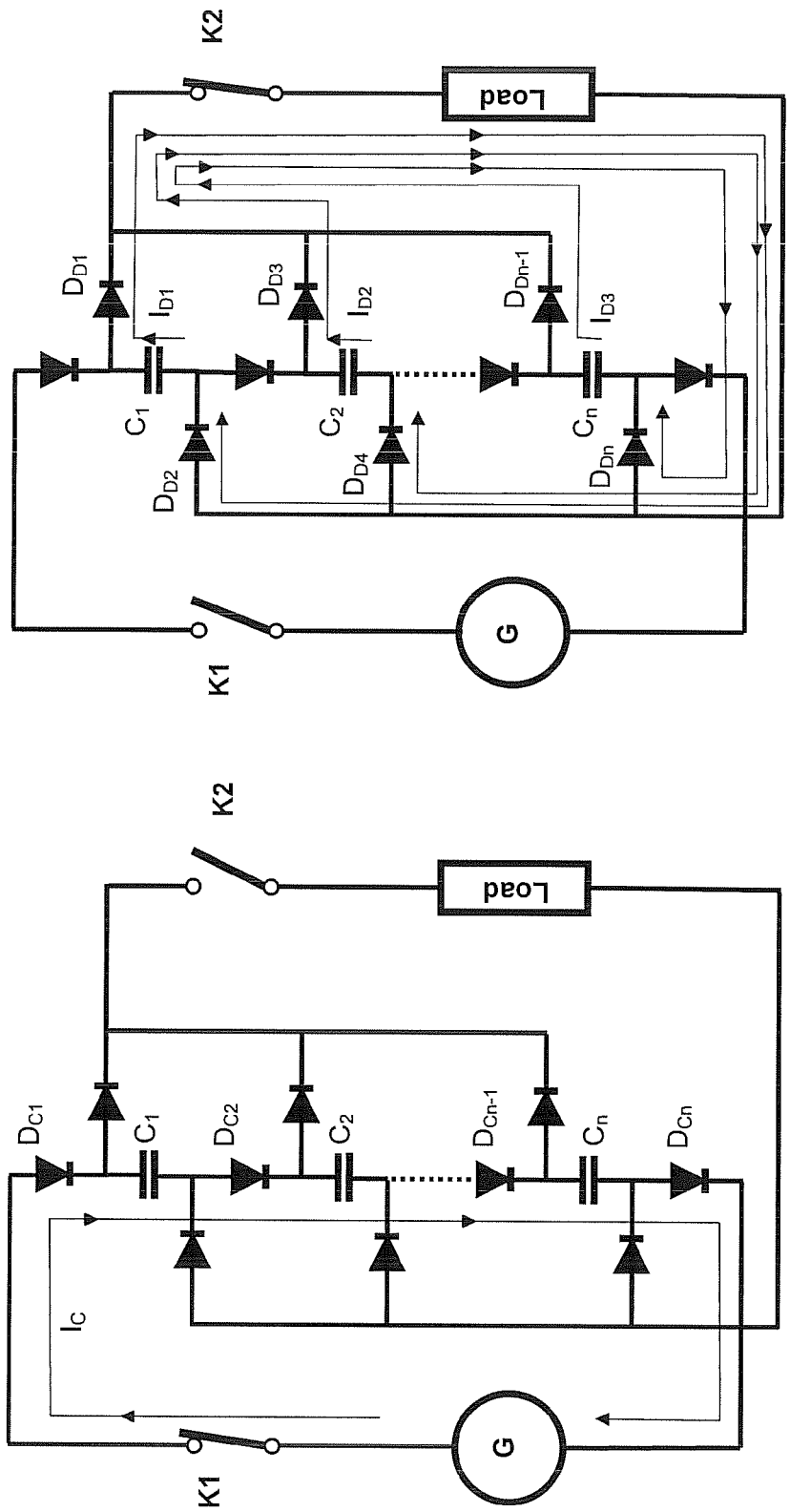
FIG. 1 illustrates a known series-charge, parallel-discharge capacitive voltage divider specifically illustrating the charging portion of a charge-discharge cycle.
FIG. 2 illustrates the same circuit illustrated in FIG. 1 but specifically illustrating the discharge portion of a charge-discharge cycle.

Repeat use of reference characters throughout the present specification and appended drawings is intended to represent same or analogous features, elements, or steps of the present subject matter.

DETAILED DESCRIPTION OF THE PREFERRED EMBODIMENTS

As referenced in the Summary of the Invention section, the present subject matter is particularly concerned with an improved single switch series-parallel capacitor-diode voltage dividing circuit.

Selected combinations of aspects of the disclosed technology correspond to a plurality of different embodiments of the present subject matter. It should be noted that each of the exemplary embodiments presented and discussed herein should not insinuate limitations of the present subject matter. Features or steps illustrated or described as part of one embodiment may be used in combination with aspects of another embodiment to yield yet further embodiments. Additionally, certain features may be interchanged with similar devices or features not expressly mentioned which perform the same or similar function.

Referring now to the drawings, and with initial reference to FIGS. 1 and 2, there is illustrated the operation of a generally known capacitive divider circuitry. As illustrated in FIGS. 1 and 2, a capacitive voltage divider having a plurality of series coupled capacitors $C_1, C_2, \ldots C_n$ coupled alternately in series with a plurality of diodes $D_{C1}, D_{C2} \ldots D_{Cn}$ has been provided. An input source G is provided to supply charging current $I_C$ to the series coupled capacitors $C_1, C_2, \ldots C_n$ by way of a first switch K1 and the plurality of diodes $D_{C1}, D_{C2} \ldots D_{Cn}$.

It will be appreciated that during a capacitor charging period, first switch K1 is closed while a second switch K2, coupled to a load, is opened. It should be further appreciated that the charging circuit is functional regardless of whether source G corresponds to either an AC or DC supply; however, if source G is provided as an AC supply, charging and operation of first switch K1 must be coordinated with the positive half cycle of the AC source while discharging of the capacitors and operation of second switch K2 must be coordinated with the negative half cycle of the AC source.

With reference to FIG. 2, it will be noted that second switch K2 is coupled to the load and to a second plurality of diodes $D_{D1}, D_{D2}, \ldots D_{Dn}$ such that, upon closure of switch K2, and concurrent opening of switch K1, charge stored in series coupled capacitors $C_1, C_2, \ldots C_n$ during the charging portion of the cycle store is discharged by way of the second plurality of diodes $D_{D1}, D_{D2}, \ldots D_{Dn}$ to provide a plurality of current flows $I_{D1}, I_{D2} \ldots I_{Dn}$ through the load, thereby effectively providing discharge of all of the capacitors in parallel through the load.

Figure 4:
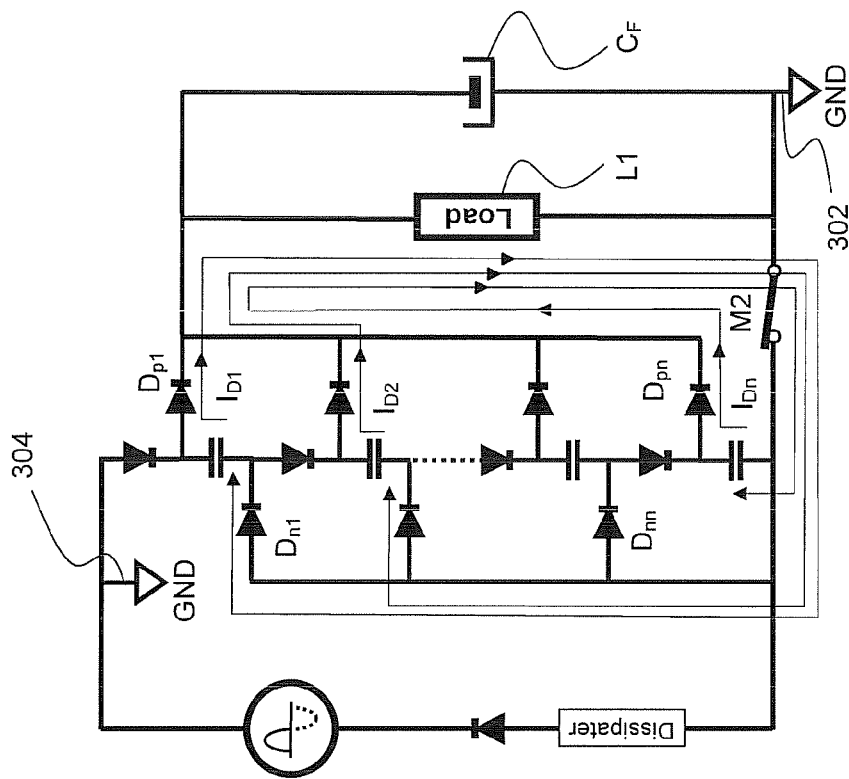
FIG. 4 illustrates the exemplary voltage divider embodiment in accordance with the present technology as illustrated in present FIG. 3, but specifically illustrating the discharge portion of the present charge-discharge cycle subject matter.

Reference will now be made in detail to the presently preferred embodiments of the subject series-parallel capacitor-diode voltage dividing circuit. Initially with reference to FIGS. 3 and 4, there are illustrated and represented a capacitive voltage divider and its operation in accordance with present technology. A comparison of FIGS. 3 and 4 with FIGS. 1 and 2 reflects that there are a number of differences among the illustrations. In a first instance, while both of the series capacitor and diode strings begin with a diode, the diode/capacitor string in accordance with the present subject matter ends with a capacitor as compared to the known configuration ending with a diode. In a second instance, the subject matter of the present technology provides a pair of ground reference connections 302, 304 whose functions will be described further hereinbelow. Thirdly, the configuration of the present technology provides a series diode 308 and dissipater element 306 in series with AC input source 300 and the charging portion of the diode/capacitor string corresponding to a first plurality of diodes $D_{m1} \ldots D_{mn}$ and a plurality of intervening capacitors $C_{m1} \ldots C_{mn}$. As a result of the foregoing, and as a further difference, the capacitive voltage divider of the present technology is configured to provide its functionality based on the operation of a single switch M2 instead of the pair of switches K1, K2 previously required.

Figure 3:
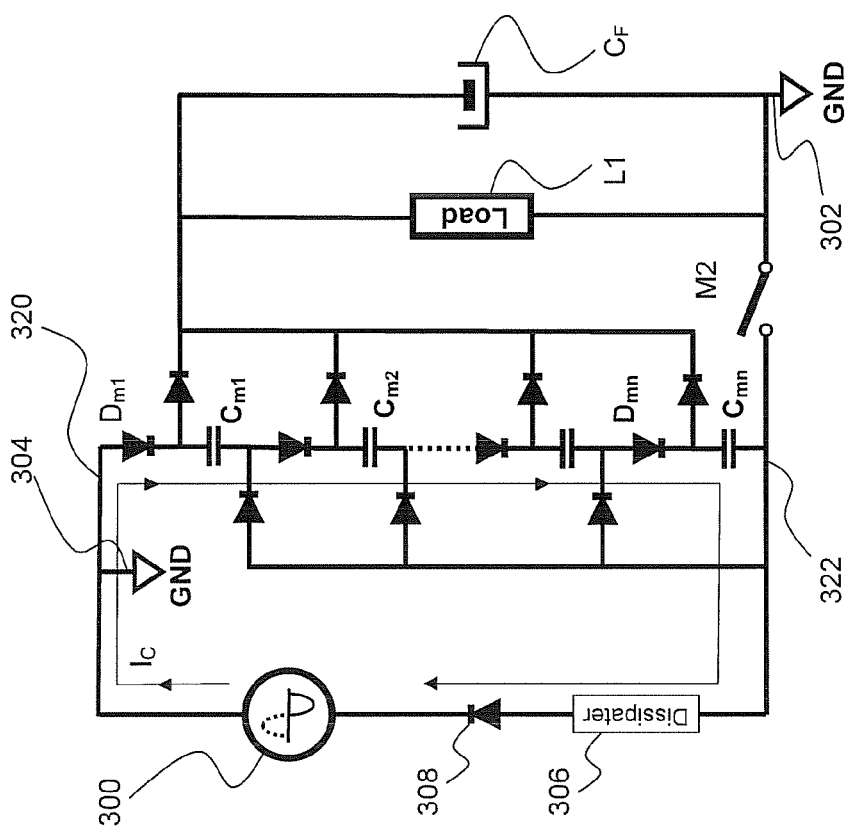
FIG. 3 illustrates an exemplary voltage divider embodiment in accordance with the present technology, and specifically illustrating the charge portion of the present charge-discharge cycle subject matter.

Operational aspects of a voltage dividing circuit constructed in accordance with the present technology are described with further reference to FIG. 3. As previously noted, the voltage divider of the present technology provides an AC input source 300 coupled to the capacitor/diode charging string corresponding to diodes $D_{m1} \ldots D_{mn}$ and capacitors $C_{m1} \ldots C_{mn}$ by way of a diode 308 and dissipater element 306, without requiring or making use of any switch equivalent to switch K1 of the previously know configuration of FIGS. 1 and 2.

In the case of the present technology, charging of capacitors $C_{m1} \ldots C_{mn}$ is achieved during the negative half cycle of the AC. This is accomplished by coupling the upper end 320 of the diode/capacitor string to ground potential 304 and by forcing that ground potential to be relatively positive with respect to the lower end 322 of the diode/capacitor string as the output of AC source 300 goes through its negative half cycle.

With the upper end 320 of the diode/capacitor string more positive than the lower end 322 thereof, charging current flow $I_C$ passes through the diode/capacitor string to charge the series coupled capacitors in a current flow fashion generally similar to that of the known configurations yet entirely without the use of a switching element such as switch K1 as previously employed. When the output of AC source 300 goes through its positive half cycle, switch M2 is closed and then charged capacitors are discharged in parallel by way of diodes $D_{n1} \ldots D_{nn}$ and $D_{p1} \ldots D_{pn}$ forming discharge currents $I_{D1}$, $I_{D2}, \ldots I_{Dn}$ through load L1. In one exemplary embodiment of the present technology, a filter capacitor $C_F$ may be provided in parallel with load L1 to provide ripple filtering and to assist in voltage regulation of the low voltage DC produced by operation of the capacitive voltage divider in accordance with present technology.

Figure 5:
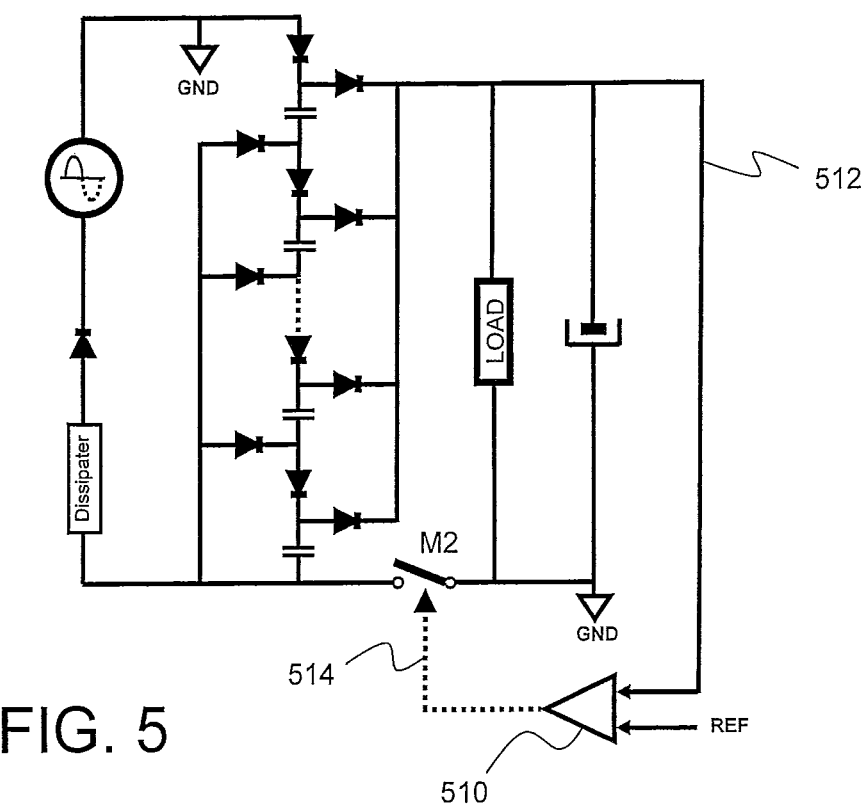
FIG. 5 illustrates an alternative voltage divider embodiment in accordance with the present technology, and including circuitry for automatically switching between the charge and discharge portions of the present cycle subject matter.

With reference now to FIG. 5, there is illustrated a capacitive voltage divider in accordance with a further exemplary embodiment of the present subject matter, and including circuitry for automatically switching between the charge and discharge portions of the cycle. As illustrated in FIG. 5, an exemplary voltage comparator 510 monitors the output voltage at line 512 (representing the voltage across the load) and compares such output voltage to a reference REF. As the output voltage at line 512 reaches a maximum voltage, exemplary switch M2 is opened under the control of an output 514 from voltage comparator 510.

Those of ordinary skill in the art will appreciate that switch M2 may correspond to a solid state switching device or may comprise more complex switching circuit, while voltage comparator 510 and reference source REF may also correspond to more complex configurations. For example, switch circuitry corresponding to illustrated switch M2 may include such as optical isolation devices, while voltage comparator 510 and reference source REF may provide for peak tracking of output voltage from monitored line 512 to provide higher efficiency for the switching operation illustrated as and/or represented by diagrammatical switch M2.

Figure 6:
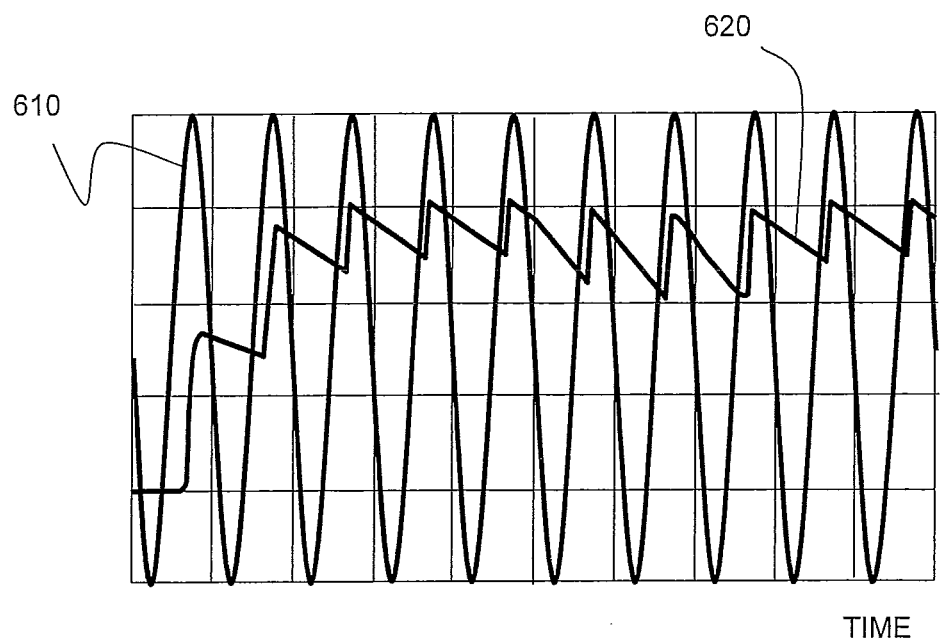
FIG. 6 graphically illustrates a present example of charge build up across a load and parallel filter capacitor from a high voltage input to the voltage divider in accordance with the present technology.

With reference now to FIG. 6, there are graphically illustrated voltage waveforms illustrating the operation of an exemplary voltage divider in accordance with the present technology. As may be seen from such graph, input voltage 610 may correspond, for example, to a high voltage AC from one phase of a multi-phase source. In an exemplary configuration, input voltage 610 may correspond to a 400 VAC input voltage that is to be reduced to, for example, approximately 5 VDC for operation, for example, of a load device or circuit.

Output voltage 620 of FIG. 6 is graphically illustrated as a filtered DC voltage as produced from an exemplary voltage divider in accordance with present technology. Those of ordinary skill in the art will appreciate that while the two traces illustrated share the same time frame, the magnitude of the traces are illustrative only and are not illustrated to the same scale. As noted previously, trace 610 representing the input voltage is representative of, for example, a 400 VAC input while trace 620 representing the output of the subject voltage divider may correspond to about 5 VDC. It should be further appreciated that alternate input and output voltage levels are possible within the spirit and scope of the present technology.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. Power supply methodology for reducing a relatively high level alternating current (AC) from an AC source to a relatively lower level direct current (DC), comprising:

providing a voltage divider configured as a series of capacitors and diodes arranged for series charging of the capacitors and parallel discharge thereof through a single switching element and no inductor in order to shift from charge mode to discharge mode; and controlling operation of the single switching element so that the capacitor series is charged during the negative half cycle of the AC source and then discharged through said single switch element during the positive half cycle thereof, thereby producing a relatively low DC voltage based on the relatively higher level AC input source;

wherein providing such voltage divider includes providing a plurality of capacitors connected in series with a first plurality of diodes for charging the capacitors, and a second plurality of diodes coupled to each of the series connected capacitors and to a single switch element for discharging the capacitors, with such voltage divider configured for having respective input and output portions, with such input portion configured for unidirectional transmission of current from the input source to the capacitive divider, and with the input and output portions of the divider configured to operate alternately;

charging of the plurality of capacitors is achieved during the negative half cycle of the AC input source by coupling an upper end of the first plurality of diodes to a ground potential and by forcing such ground potential to be relatively positive with respect to a lower end of the first plurality of diodes/capacitor string as the output of the AC input source goes through its negative half cycle; and discharging of the plurality of capacitors is achieved during the positive half cycle of the AC input source by closing the single switching element so as to discharge the plurality of capacitors through the second plurality of diodes, into a load associated therewith.

2. Power supply methodology as in claim 1, wherein such power supply methodology further includes providing a filter capacitor in parallel with such load, to provide ripple filtering and to assist in voltage regulation of the low voltage DC produced by discharge of the capacitive voltage divider.

3. Power supply methodology for reducing a relatively high level alternating current (AC) from an AC source to a relatively lower level direct current (DC), comprising:

providing a voltage divider configured as a series of capacitors and diodes arranged for series charging of the capacitors and parallel discharge thereof through a single switching element and no inductor in order to shift from charge mode to discharge mode; and controlling operation of the single switching element so that the capacitor series is charged during the negative half cycle of the AC source and then discharged through said single switch element during the positive half cycle thereof, thereby producing a relatively low DC voltage based on the relatively higher level AC input source;

wherein providing such voltage divider includes providing a plurality of capacitors connected in series with a first plurality of diodes for charging the capacitors, and a second plurality of diodes coupled to each of the series connected capacitors and to a single switch element for discharging the capacitors, with such voltage divider configured for having respective input and output portions, with such input portion configured for unidirectional transmission of current from the input source to the capacitive divider, and with the input and output portions of the divider configured to operate alternately;

charging of the plurality of capacitors is achieved during the negative half cycle of the AC input source by coupling an upper end of the first plurality of diodes to a ground potential and by forcing such ground potential to be relatively positive with respect to a lower end of the first plurality of diodes/capacitor string as the output of the AC input source goes through its negative half cycle;

discharging of the plurality of capacitors is achieved during the positive half cycle of the AC input source by closing the single switching element so as to discharge the plurality of capacitors through the second plurality of diodes, into a load associated therewith; and such power supply methodology further includes providing circuitry for automatically switching the capacitive voltage divider between charge and discharge cycles thereof.

4. Power supply methodology as in claim 2, wherein:

such circuitry includes a voltage comparator comparing the voltage output of such power supply with a reference; and such power supply methodology further includes using an optical isolation device, and peak tracking of the voltage output, to provide relatively high efficiency switching operations.

5. Power supply methodology as in claim 2, wherein:

such circuitry includes a voltage comparator comparing the voltage output of such power supply with a reference; and the AC input source corresponds to about a 400 VAC input voltage, and the voltage output of such power supply is about 5 VDC.

\* \* \* \* \*